United States Patent
Jacyno et al.

[15] 3,688,138
[45] Aug. 29, 1972

[54] SUBFRAME FOR A POWER TOOL EMPLOYING TWO PLATE-LIKE ELEMENTS WITH CUT OUT PORTIONS FOR MOTOR AND TRANSMISSION

[72] Inventors: Anthony Jacyno, Aurora; Grover P. Holther, Mount Prospect, both of Ill.

[73] Assignee: G. W. Murphy Industries, Inc., Portable Electric Tools Division, Houston, Tex.

[22] Filed: Oct. 6, 1970

[21] Appl. No.: 78,432

[52] U.S. Cl. .......................310/50, 310/83, 310/89, 310/91
[51] Int. Cl. ..........................H02k 7/08, H02k 7/14
[58] Field of Search......310/43, 47, 50, 239, 40 MM, 310/42, 85, 89, 91, 83

[56] References Cited

UNITED STATES PATENTS

| | | | |
|---|---|---|---|
| 2,350,631 | 6/1944 | Mitchell | 310/83 |
| 2,730,635 | 1/1956 | McCabe | 310/50 |
| 3,121,813 | 2/1964 | Pratt et al. | 310/50 |
| 3,156,838 | 11/1964 | Winther | 310/42 |
| 2,965,774 | 12/1960 | Rangus | 310/50 |
| 3,313,964 | 4/1967 | Mattson et al. | 310/50 X |
| 3,418,504 | 12/1968 | Paule et al. | 310/50 |
| 2,539,003 | 1/1951 | Agustoni | 310/50 X |
| 1,828,903 | 10/1931 | Moretti | 310/50 X |
| 2,552,023 | 5/1951 | Andresen | 310/50 X |
| 3,479,540 | 11/1969 | Fox | 310/50 |
| 3,482,125 | 12/1969 | Fleckenstein | 310/43 X |
| 3,500,082 | 3/1970 | Tolegian | 310/50 |
| 3,502,915 | 3/1970 | Moret et al. | 310/47 |

FOREIGN PATENTS OR APPLICATIONS

| | | | |
|---|---|---|---|
| 696,878 | 10/1940 | Germany | 310/89 |

*Primary Examiner*—Lewis H. Myers
*Assistant Examiner*—Stanley J. Witkowski
*Attorney*—Hofgren, Wegner, Allen, Stellman & McCord

[57] ABSTRACT

A subframe for a motor and a transmission to be employed in a portable power tool. The subframe is formed of two plate-like elements that are substantial mirror images of one another containing complementary cut out portions for receiving the motor and transmission and which are secured together to define the subframe. Each plate-like member includes complementary struck out portions for receiving bearings for mounting rotating parts of the transmission and the motor. The recesses may be semi-spherical for receiving spherical bearings or cylindrical for receiving sleeve or cylindrical or ball bearings. The plate-like members may be secured together by any of a variety of means such as sheet metal screws, struck metal tabs, spot welding or adhesives. The subframe may include a rotary output or may mount within its confines a mechanism for converting rotary motion to any desired type of motion as for example, reciprocating motion. Alternately, a subframe having a rotary output shaft may be employed in conjunction with an adaptor for converting rotary motion to reciprocating motion so that a single type of subframe may be employed in power tools requiring both rotary outputs and reciprocating outputs.

16 Claims, 7 Drawing Figures

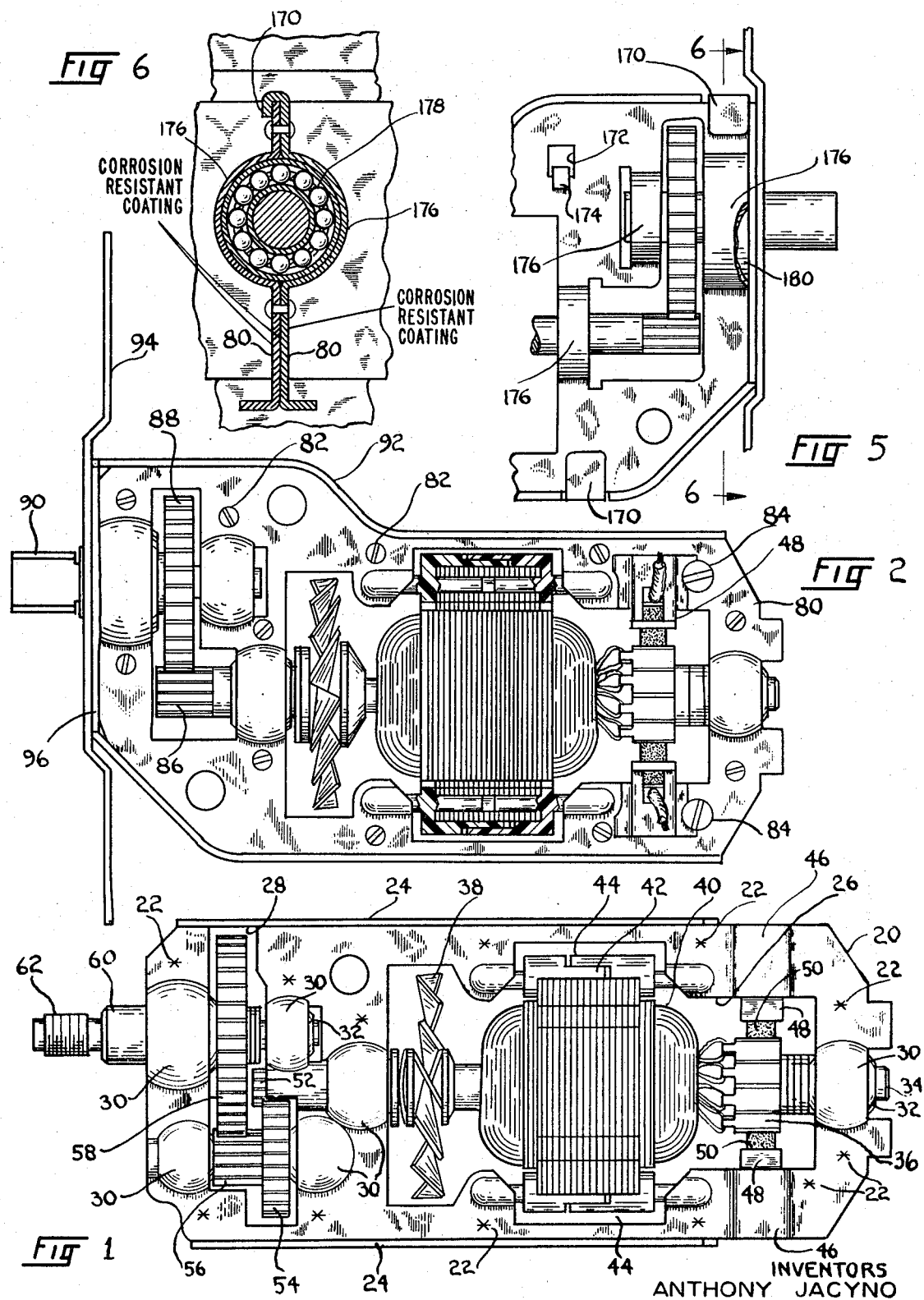

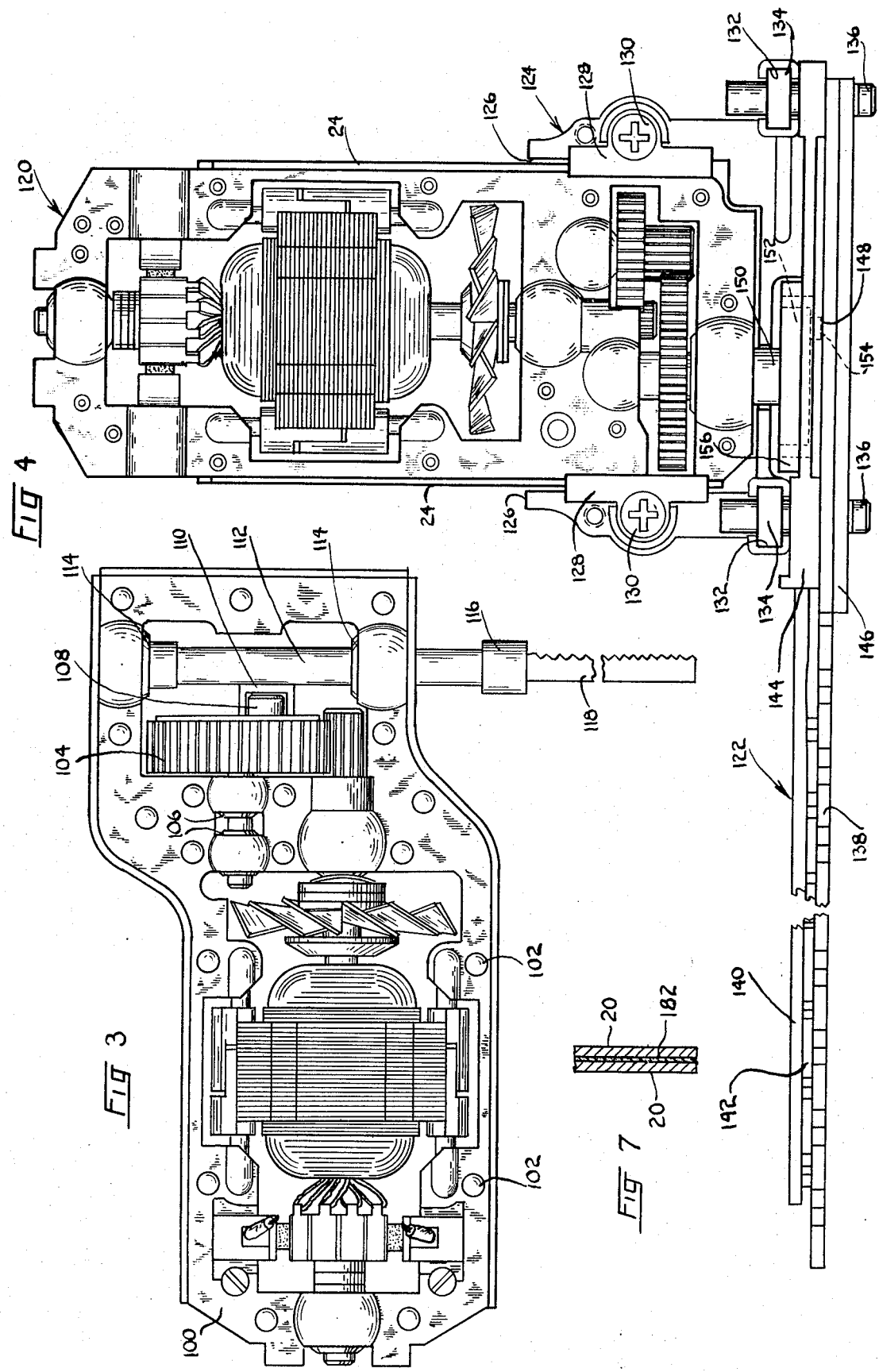

SUBFRAME FOR A POWER TOOL EMPLOYING TWO PLATE-LIKE ELEMENTS WITH CUT OUT PORTIONS FOR MOTOR AND TRANSMISSION

BACKGROUND OF THE INVENTION

This invention relates to portable hand tools and in particular, to subframes for holding the motor and transmission parts to be employed in a main power tool casing or housing.

Many frames are currently in use for mounting motors and gears in a housing to provide power for portable tools. In most cases, the motor and transmission are secured directly to the main tool housing. The primary disadvantage of this arrangement is that the tool housing must be cast and it is therefore necessary to disassemble not only the housing, but parts of the motor and transmission as well in order to repair or replace worn or damaged parts. Moreover, in such a construction it is necessary that the bearing bosses in the housing be machined separately in separate machining operations to assure that the bearings are accurately located.

It has therefore been proposed to provide rotor and transmission frames which include cast supporting members for the motor and transmission parts and which are separate from the main tool housing. The principal disadvantage for such a construction is that the die cast parts required are difficult to manufacture with any degree of accuracy. And, in any event, such constructions require separate machining operations for their various bearing bosses.

SUMMARY OF THE INVENTION

It is the principal object of the invention to provide a new and improved subframe for mounting motor and transmission parts and adapted to be received in a main power tool casing or housing.

More particularly, it is the object of the invention to provide such a subframe formed of two plate-like elements which may be secured together by any of a variety of securing means, can be formed to employ any of a variety of different types of bearings, and which is readily suitable for use in various kinds of tools which may or may not have different types of output motion. The realization of the foregoing objects permits a manufacturer to select parts as well as fabrication methods according to his existing capabilities as determined by plant equipment, inventory, etc.

The exemplary embodiment of the invention realizes the foregoing objects through a construction employing a subframe formed of two plate-like frame members that are secured together in contiguous engagement substantially about their entire periphery. The frame members are formed as substantial mirror images of one another and by means of stamping or forming, or other conventional operations, each is provided with complementary recesses for the receipt of bearings. According to one construction, the complementary recesses are semispherical to define spherical bearing receiving recesses. Alternately, the complementary recesses may be semi-cylindrical to receive other types of bearings such as conventional ball bearings, cylindrical bearings, and sleeve-like bearings.

The plates may be secured together in the aforementioned relation by any number of means. For example, one embodiment employs rivets while the other employs sheet metal screws. Still a third employs spot welds while a fourth employs metal tabs formed in one or both of the frame members and which may overlap the side of the other frame member or, in the alternative, extend through a cut out in the other frame member. A fifth alternative is the use of adhesives.

Preferably, a subframe made according to the invention employs coated metal frame members. The coating is provided to minimize rust and/or galvanic corrosion at the points of contact of the two frame members with each other and/or with bearings. According to one embodiment of the invention, the coating may be a nickel, cadmium or chromium coating or antirust combinations thereof which may be deposited on the frame members by dipping in a molten bath or by electrocoating processes.

A preferred embodiment of the invention results in a subframe which may be employed in totally different types of power tools. For example, the subframe includes a rotary output shaft which can be used to directly drive a chuck of an electric drill or, in the alternative, may drive an eccentric for converting rotary motion to reciprocating motion to be employed in, for example, a hedge trimmer.

Other objects and advantages of the invention will become apparent from the following specification taken in conjunction with the accompanying drawings.

DESCRIPTION OF THE DRAWINGS

FIG. 1 is a side elevation of a subframe made according to one embodiment of the invention;

FIG. 2 is a side elevation of a modified subframe made according to another embodiment of the invention;

FIG. 3 is a side elevation of a subframe made according to still another embodiment of the invention;

FIG. 4 is a side elevation of a subframe made generally in accordance with the first embodiment of the invention save for means securing the subframe plates together, and employed in a tool having a reciprocating motion output;

FIG. 5 is a fragmentary side elevation of still another embodiment of the invention;

FIG. 6 is a vertical section taken approximately along the line 6—6 of FIG. 5; and FIG. 7 is a fragmentary sectional view of still another embodiment of the invention.

DESCRIPTION OF THE PREFERRED EMBODIMENTS

One embodiment of a subframe made according to the invention is illustrated in FIG. 1 and comprises a pair of plates 20 (only one of which is shown) secured together to define a subframe by spot welds 22. Each of the plates 20 includes outwardly extending flanges 24 at its sides for stiffening purposes and both plates 20 are formed as substantial mirror images of one another. According to one embodiment of the invention, the plates may be formed of stamped metal. When such is done, it is desirable to put a coating on the plates 20 to minimize rust and/or galvanic corrosion where they are in contact with each other or with bearings particularly since the bearings will normally be of a metal different from that of the plates. Rusting of the plates may also result from the high temperatures generated when the motor overheats or runs hot from use. Any coating capable of standing up to the high temperatures or the vibration normally encountered in the operation of the tool with which the subframe is to be employed may be used and it has been found that either nickel, cadmium or chromium coating are satisfactory. Either type of coating can be placed on the plates 20 by conventional plating operations or by immersions in baths.

The subframe includes a motor receiving opening 26 defined by cut outs in both plates 20 as well as a transmission receiving opening 28 similarly defined. At various locations, each of the plates 20 is provided with semi-spherical struck out portions 30 for the receipt of spherical bearings 32.

Two of the bearings 32 mount opposite ends of a motor shaft 34 which has a commutator 36 near one end thereof and an air impeller 38 near the other end thereof. Intermediate the commutator 36 and the air impeller 38 is a conventional rotor structure 40 having windings (not shown) electrically associated with the commutator 36.

Surrounding the rotor 40 is a conventional field or stator structure 42 which is secured to the subframe including plates 20 by means of insulating mounts 44 which preferably are of the type described in the copending application of Anthony Jacyno entitled "Modular Design — Double Insulated Field," Ser. No. 37,810, filed May 15, 1970 and assigned to the same assignee as the instant invention.

The forwardmost one of the plates 20 as viewed in FIG. 1 further includes rectangular struck out portions 46 which, in conjunction with the opposite plate 20 define brush holder receiving spaces. Within the brush holder receiving spaces are insulators which receive brush holders 48 which in turn mount respective brushes 50 for electromechanical contact with the commutator 36.

The end of the shaft adjacent the impeller 38 terminates in the transmission receiving opening 28 and includes gear teeth 52 in engagement with a large pinion gear 54 which, in turn, is drivingly connected to a small reduction gear 56. The adjacent semi-spherical struck out portions 30 mount bearings which in turn receive a shaft rotatably mounting the gears 54 and 56.

A large drive gear 58 for driving the tool output shaft 60 is in engagement with the small reduction gear 56 and semispherical recesses 30 adjacent the gear 58 mount bearings 32 for rotatably mounting the output shaft 60. As shown in FIG. 1, the output shaft 60 terminates in a threaded end 62 which could, in the final tool assembly, mount a chuck or the like. Alternatively, the same could be used to mount an eccentric if it is desired to convert rotary motion output of the shaft 62 to a reciprocating motion output.

Another embodiment of the subframe made according to the invention is illustrated in FIG. 2 and is generally seen to comprise a pair of plates 80 (only one of which is shown) with the illustrated plate 80 corresponding approximately to the plate 20 not illustrated in FIG. 1. That is, brush holders 48 are fully in view in FIG. 2 while they are partially blocked from sight by the struck out portion 46 in FIG. 1.

The plates 80 in the embodiment illustrated in FIG. 2 are secured together by sheet metal screws 82 rather than by spot welds. The brush holders 48 are seen to be secured to the subframe by means of set or sheet metal screws 84 and the construction of the rotor, the commutator, the stator and the impeller are all substantially identical to that illustrated in FIG. 1. Therefore, in the interest of brevity, only those portions of the embodiment shown in FIG. 2 that differ from the embodiment shown in FIG. 1 will be discussed.

Specifically, the output shaft of the motor terminates in gear teeth 86 which are in direct engagement with enlarged output gear 88 mounted for rotation with an output shaft 90. Because of the direct engagement of the output gear 88 with the drive shaft 86, the plates 80 are provided with an offset portion 92 to fully house the gear 88. The assembly may also include a mounting plate 94 which may be riveted or spot welded to outturned ends 96 of the plates 80. The mounting of the plate 94 may include suitable mounting means (not shown) for mounting the same in a tool housing.

It will therefore be appreciated that the principal difference between the subframe shown in FIGS. 1 and 2 is the fact that the former employs spot welding as a securing means while the latter employs set screws. Also, the output shaft 60 will rotate at a much lesser rate than the output shaft 90 in view of the difference in gearing, which difference in gearing also necessitates the presence of the offset portion 92 and plates 80.

Still another embodiment of the invention is illustrated in FIG. 3 and includes a pair of plates 100 generally similar to the plates 80 illustrated in FIG. 2. In the case of the embodiment shown in FIG. 3, the plates 100 are secured together by means of rivets 102 and the gearing is altered insofar as a drive gear 104 roughly corresponding to the drive gear 88 is mounted in a cantilever fashion by a pair of bearings 106 located to one side thereof rather than about both sides of the drive gear 104. The purpose of this construction is to leave one side of the drive gear 104 free for the mounting of a motion converting mechanism. Specifically, the drive gear 104 mounts an eccentric stub shaft 108 which is received in a horizontally elongated channel 110 mounted on a reciprocable shaft 112.

The subframe illustrated in FIG. 3 further differs from that illustrated in FIG. 2 in the presence of a pair of bearings 114 receiving the shaft 112 for reciprocal movement therein. One end of the shaft 112 extends below the lowermost bearing 114 and terminates in a tool mount 116 which may receive a cutting blade 118 or the like in a manner well-known in the art.

When the motor is energized to rotate the gear 104, the resultant movement of the eccentric stub shaft 108 and the following action of the channel 110 result in the conversion of the rotary motion of the gear 104 to a reciprocating motion of the shaft 112 so that the cutting tool 118 will be reciprocated. As will be apparent, the subframe illustrated in FIG. 3 is ideally suited for use in a so-called "saber saw".

Still another embodiment of the invention is illustrated in FIG. 4 and includes a subframe, generally designated 120, which is virtually identical to the subframe illustrated in FIG. 1 with the exception that the plates comprising the same are secured together by rivets rather than spot welds and in the nature of the output shaft. Additionally, an adaptor casing is provided so that the subframe 120 may be secured to a reciprocating work performing member as, for example, a hedge clipping tool, generally designated 122.

More particularly, the embodiment illustrated in FIG. 4 incudes an adaptor casing 124 having spaced apart sides 126 and a back wall (not shown) in which the subframe 120 may be received. Clamping means 128 overlying the flanges 24 of the subframe plates are secured in place by means of Phillips screws 130 to tightly hold the subframe 120 in the adaptor casing. The casing 124 further includes rectangular slots 132 for receiving nuts 134 which cooperate with set screws 136 to secure the work performing member 122 to the subframe.

As mentioned previously, the specific work performing member illustrated is a hedge clipper and includes a notched, stationary member 138 and a bearing strip 140 sandwiching a reciprocating, notched cutting element 142, all of generally conventional construction.

The cutting element 142 extends into a spacing plate 144 sandwiched between the casing 124, the stationary element 138 and a mounting plate 146 and includes a slot 148 therein which is elongated in a direction extending into and out of the paper as viewed in FIG. 4.

An output shaft 150 of the subframe 120 mounts a circular element 152 which in turn mounts an eccentric pin 154 which is received in the slot 148. The circular element is surrounded by a collar 156 on the spacing plate 144.

When the motor is energized, the resultant rotation of the output shaft 150 will cause the eccentric 154 to describe a circle and since the same is located within the slot 148, reciprocation of the cutting element 142 will result.

It will be appreciated from a comparison of FIGS. 1 and 4 that a subframe made according to the embodiment of the invention therein shown may find use in a variety of different portable tools without regard to the nature of the motion necessary for the work performing member associated therewith.

Still another embodiment of the invention is illustrated in FIGS. 5 and 6 and is generally similar to that illustrated in FIG. 2. However, rather than employ set screws as securing means to secure the two plates 80 together, one of the plates 80 may be provided with one or more tabs 170 which may be bent over and around the periphery of the other plate 80 to tightly grab the same to secure the plates together. Alternatively, one of the plates 80 may be provided with a cut out 172 through which a tab 174 from the other plate may extend to be bent over therein and tightly hold the two plates in engagement.

The embodiment illustrated in FIGS. 5 and 6 shows still another modification of the basic invention in terms of bearing receiving recesses. Specifically, bearing receiving recesses may be defined by cylindrical struck out portions 176 in each of the plates 80 to receive various kinds of bearings such as the ball bearing structure illustrated at 178. Alternately, the semi-cylindrical struck out portions may cooperate together to receive sleeve type bearings 180 or conventional cylindrical bearings (both collectively hereinafter referred to as sleeve bearings) if desired. According to this embodiment of the invention, the axes of the cylindrical recesses are coincident with the axis of rotation of the shafts received in bearings therein.

Still another embodiment of the invention is illustrated in FIG. 7 and may be generally similar to that illustrated in FIG. 1 except that the frame members 20 are secured together by an interposed layer 182 of any suitable adhesive.

From the foregoing, it will be appreciated that the invention provides a subframe for use in power tools that can be produced in any of a variety of ways depending upon a particular manufacturer's capabilities in terms of parts available, stamping machinery, welding equipment, riveting equipment, etc. and which eliminates the disadvantages in machining operations attendant various prior art constructions.

What is claimed is:

1. A subframe for a hand-held tool comprising: a pair of plate-like frame members secured in side-by-side relationship and being substantial mirror images of one another; first complementary cut outs in said frame members defining a motor receiving opening; second complementary cut outs in said frame member defining a transmission receiving opening; a motor having a shaft within said motor receiving opening, said shaft extending into said transmission receiving opening; a transmission in said transmission receiving opening, said transmission including at least one rotary shaft; and means mounting said shafts for rotation in said frame members, said mounting means including complementary semi-cylindrical struck out portions in both of said frame members and defining a cylindrical bearing receiving space, the cylindrical axis of said bearing receiving space being substantially coincident with the axis of rotation of at least one of said shafts, and bearing means in said recess, said bearing means having an outer cylindrical surface.

2. The subframe of claim 1 wherein said bearing means comprises ball bearings.

3. The subframe of claim 1 wherein said bearing means comprises sleeve bearings.

4. The subframe of claim 1 where in said frame members are secured together by metal screws.

5. The subframe of claim 1 wherein said frame members are secured together by spot welds.

6. The subframe of claim 1 wherein said frame members are secured together by an adhesive between the frame members.

7. The subframe of claim 1 wherein said frame members are secured together by metal tabs on one of said frame members bent about and engaging the other of said frame members.

8. The subframe of claim 7 wherein said tabs are located on the sides of said one frame member and are bent about the sides of the other frame member.

9. The subframe of claim 7 wherein said tabs are in the body of said one frame member and extend through a cut out in the other frame member.

10. The subframe of claim 1 further including a motion converting mechanism located within said transmission opening, and means operatively connecting said mechanism to said transmission.

11. The subframe of claim 1 further including a motion converting mechanism, and means operatively connecting said transmission shaft to said mechanism.

12. The subframe of claim 1 wherein said frame members are formed of a metal coated with a corrosion resistant material.

13. A subframe for a hand-held tool comprising: a pair of plate-like frame members secured in side-byside relationship and being substantial mirror images of one another; first complementary cut outs in said frame members defining a motor receiving opening; second complementary cut outs in said frame member defining a transmission receiving opening; a motor having a shaft within said motor receiving opening, said shaft extending into said transmission receiving opening; a transmission in said transmission receiving opening, said transmission including at least one rotary shaft; and means mounting said shafts for rotation in said frame members, said mounting means including complementary struck out portions in both of said frame members and defining a bearing receiving recess, bearing means in said recess, said bearing means having an outer cylindrical surface, means for converting rotary motion of said transmission shaft to reciprocating motion and adapted to be associated with a work performing member, and means operatively connecting said transmission shaft to said converting means.

14. The subframe of claim 13 wherein said converting means comprises a shaft mounted for reciprocation within said subframe, an elongated channel secured to said shaft, said channel being elongated in a direction transverse to the direction of reciprocation of said shaft, and a stub shaft located in said channel and eccentrically connected to said transmission shaft.

15. The subframe of claim 13 wherein said transmission includes an output shaft providing rotary motion, adaptor means mounting a housing on said subframe, said adaptor extending into said housing and mounting an eccentric stub shaft, and means in said housing mounted for reciprocation therein including an elongated slot receiving said stub shaft.

16. The subframe of claim 13 wherein said frame members are formed of a metal coated with a corrosion resistant material.

* * * * *